United States Patent Office 2,726,214
Patented Dec. 6, 1955

2,726,214

HALOPHOSPHATE PHOSPHORS

Peter Whitten Ranby and Stanley Thomas Henderson, London, England, assignors to Thorn Electrical Industries Limited, London, England No Drawing. Application August 7, 1951,
Serial No. 240,792

3 Claims. (Cl. 252—301.4)

This invention relates to luminescent materials suitable for use with low-pressure discharge lamps containing mercury and an inert gas such as argon or krypton, the luminescent material being excited by radiations present in the mercury discharge and especially by the radiation of wavelength 2537 A. U. The materials are also suitable for use with high pressure mercury vapour discharge lamps.

Some known luminescent materials which have been proposed for this purpose, and which will hereafter be referred to as "halophosphates" are those which may be represented by the chemical formula $3M_3(PO_4)_2.M'X_2$ where M and M' are each calcium or strontium or both of these two and X is fluorine or chlorine or both of these two. The halophosphate matrix is activated by from 0.1% to 2% of antimony (calculated as the proportion of metal by weight of the luminescent material) with or without the addition of up to 5% of manganese (calculated in the same manner as the antimony). A range of luminescent colours between blue and pink is obtained when the materials are excited by radiations present in low-pressure mercury vapour discharge lamps.

Other luminescent materials, which have also been proposed, and which will hereafter be referred to as "aluminum-containing halophosphates" are those whose molecular proportions fall within the following limits: Assuming that only calcium is present in the form of its halide and the other metals, the phosphorus and the remainder of the calcium are present in the form of their oxides, then in relation to a total phosphorus content represented by 10 mols. of phosphorus pentoxide ($P_2O_5$), there is also present up to 3.0 mols. of manganese oxide (MnO, from 0.3 to 2.0 mols. of aluminum oxide ($Al_2O_3$), from 0.03 to 0.28 mols. of antimony oxide ($Sb_2O_3$) and from 3.0 to 4.0 mols. of calcium fluoride ($CaF_2$) of which up to 70 mol. percent may be replaced by calcium chloride ($CaCl_2$), that proportion of phosphorus pentoxide which has not combined with the manganese, aluminum or antimony oxides being combined with calcium oxide (CaO) in the ratio of 3 mols. of calcium oxide to 1 mol. of phosphorus pentoxide. A range of luminescent colours between blue and pink is obtained. Some of these aluminum-containing halophosphate luminescent materials are described in cognate British patent applications Nos. 8,589/48 and 18,450/48.

The term "specified halophosphates" will be used whenever it is desired to refer to both "halophosphates" and "aluminum-containing halophosphates," as hereinbefore defined.

When known halophosphate materials are used in low-pressure mercury vapour discharge lamps, it is found that the colour of the lamps is deficient in radiations from the red portion of the visible spectrum. For some applications of the discharge lamps this is a disadvantage.

In some applications of discharge lamps using known aluminum-containing halophosphates it is desirable to supplement the usual colour of the lamps by radiations from the red portions of the visible spectrum.

The object of this invention is to provide new luminescent materials in which the usual luminescence of known specified halophosphates is supplemented by radiations from the red portion of the visible spectrum.

According to this invention a luminescent material which fulfils this object is constituted by any of the specified halophosphates in which the rare earth element samarium is incorporated as an activator, the amount of samarium present (calculated as the proportion of samarium by weight of the luminescent material less other activators) being at least 0.01%.

The samarium compound is added to the mixture from which the luminescent material is prepared. The material resulting from the usual firing process is thus activated by samarium and antimony with or without the addition of manganese. The samarium may be added in the form of an oxide or any compound which is readily converted to an oxide on heating or in the form of a chloride. The amount of samarium (calculated as the proportion of metal by weight of the luminescent material less other activators) should be at least 0.01% in order to produce a noticeable effect, and may be increased up to 5%. Larger additions of samarium, within limits, are not deleterious to the red luminescence but are not desirable owing to the high cost of samarium compounds.

The emission spectra of the new luminescent materials are each found to have a series of narrow bands or diffuse lines superimposed on the spectrum which is obtained with the specified halophosphates alone. These bands lie mainly in the region from 6600 to 5900 A. U. In particular it is usually found that at least one of the bands or diffuse lines at approximately 6550 and 6450 A. U. are well marked and provide an intensity of red light not found with the known specified halophosphates. It is also found with some of the new luminescent materials that another band or diffuse line near 6280 A. U. can be identified and/or other bands or diffuse lines can be found in the orange region, e. g. near 6170, 6070 and 5980 A. U.

Methods of preparing luminescent materials in accordance with the invention will now be described, by way of example. All of the materials used should be of the high degree of purity which is recognised to be necessary for the preparation of luminescent materials.

In the first example, 44.3 grams of calcium monohydrogen phosphate (dried), 15.0 grams of calcium carbonate, 3.7 grams of calcium fluoride, 1.7 grams of antimony oxide, 1.7 grams of manganese chloride tetrahydrate and 0.03 gram of samarium oxide are thoroughly mixed together and are then heated in a closed silica crucible for half an hour at 1050° C. When cool the product is ground and may be reheated for another half an hour at 1150° C. The luminescent material thus obtained has an antimony content within the range specified.

In the second example, the method of the first example is modified by using only 9.8 grams of calcium carbonate and by incorporating 1.7 grams of aluminum oxide into the above-mentioned mixture before it is heated for the first time.

We claim:

1. A luminescent material consisting essentially of a halophosphate of a metal selected from the group consisting of calcium and strontium, and in which the halogen is selected from the group consisting of chlorine and fluorine, the phosphor being activated by an activator selected from the group consisting of antimony alone and antimony and manganese jointly, the antimony being present in an amount between 0.1% to 2% of the weight of the luminescent material, the manganese when present being in an amount up to 5% of the weight of the luminescent material, and samarium being present in an amount between about 0.01% and 5% by weight of the luminescent material less activators.

2. A luminescent material consisting essentially of a halophosphate of a metal selected from the group consisting of calcium and strontium, and in which the halogen is selected from the group consisting of chlorine and fluorine, the phosphor being activated by an activator selected from the group consisting of antimony alone and antimony and manganese jointly, the antimony being present in an amount between 0.1% to 2% of the weight of the luminescent material, the manganese when present being in an amount up to 5% of the weight of the luminescent material, and samarium being present in an amount between about 0.01% and 5% by weight of the luminescent material less activators, and containing for each 10 moles of phosphorus pentoxide in the halophosphate, between about 0.3 to 2.0 moles of aluminum oxide.

3. A luminescent material consisting essentially of a halophosphate of a metal selected from the group consisting of calcium and strontium, and in which the halogen is selected from the group consisting of chlorine and fluorine, the phosphor being activated by an activator selected from the group consisting of antimony alone and antimony and manganese jointly, the antimony being present in an amount between 0.1% to 2% of the weight of the luminescent material, the manganese when present being in an amount up to 5% of the weight of the luminescent material, and samarium being present in an amount between about 0.01% and 5% by weight of the luminescent material less activators, the halophosphate being selected from the group consisting of the halophosphate free from aluminum and the halophosphate containing between about 0.3 to 2.0 moles of aluminum oxide for each 10 moles of phosphorus pentoxide.

References Cited in the file of this patent

UNITED STATES PATENTS 2,488,733    McKeag _____ Nov. 22, 1949

FOREIGN PATENTS 578,272    Great Britain _____ June 21, 1946
645,502    Great Britain _____ Nov. 1, 1950